(12) United States Patent
Plache et al.

(10) Patent No.: US 9,261,877 B2
(45) Date of Patent: Feb. 16, 2016

(54) MULTIPLE MACHINE INTERFACE

(75) Inventors: Kenneth Plache, Scottsdale, AZ (US); Daniel B. Seger, III, Kennesaw, GA (US); Raymond Staron, Chagrin Falls, OH (US); Robert J. Kretschmann, Bay Village, OH (US); Taryl Jasper, South Euclid, OH (US); James Harry Jarrett, Baltimore, MD (US); Russell Brandes, Brunswick, OH (US); Ronald Bliss, Twinsburg, OH (US); Michael Kalan, Highland Heights, OH (US); Subbian Govindaraj, Solon, OH (US); Kenwood Hall, Hudson, OH (US); Douglas J. Reichard, Fairview, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 520 days.

(21) Appl. No.: 12/893,545

(22) Filed: Sep. 29, 2010

(65) Prior Publication Data

US 2011/0022195 A1    Jan. 27, 2011

Related U.S. Application Data

(63) Continuation-in-part of application No. 11/536,715, filed on Sep. 29, 2006, now Pat. No. 7,856,279, and a continuation-in-part of application No. 11/536,746, filed on Sep. 29, 2006, now Pat. No. 7,835,805, and a (Continued)

(51) Int. Cl.
*G06F 17/30* (2006.01)
*G05B 19/418* (2006.01)
(Continued)

(52) U.S. Cl.
CPC ...... *G05B 19/41845* (2013.01); *G05B 19/0426* (2013.01); *G05B 19/056* (2013.01);
(Continued)

(58) Field of Classification Search
CPC .................................................. G06F 9/541
USPC ............................................................ 700/83
See application file for complete search history.

(56) References Cited

U.S. PATENT DOCUMENTS 5,485,620 A    1/1996  Sadre et al.
5,522,066 A    5/1996  Lu
(Continued)

FOREIGN PATENT DOCUMENTS

CN    101201598 A    6/2008
CN    101201599 A    6/2008
(Continued)

OTHER PUBLICATIONS

Article entitled "Viewanyware solutions from Rockwell Automation", by SAIMC, dated May 2001.*
(Continued)

*Primary Examiner* — Mahesh Dwivedi
(74) *Attorney, Agent, or Firm* — Amin, Turocy & Watson, LLP

(57) ABSTRACT

Aspects describe multiple machine interfaces that provide automated implementations of a host that executes at least one service. The service comprises internal aspects, which include a reusable definition and a specification, which are hidden from a user or selectively exposed but not modifiable by the user. Functional connections and controls are provided for the automated implementations of the host. Platform configurations, which include the at least one service, interact with the automated implementation of the host. One or more functionalities of the functional connections can be selectively exposed based on a user credential. The automated implementation of the host comprises execution of the at least one service.

20 Claims, 12 Drawing Sheets

Related U.S. Application Data continuation-in-part of application No. 11/536,760, filed on Sep. 29, 2006, now Pat. No. 7,912,560, and a continuation-in-part of application No. 11/536,791, filed on Sep. 29, 2006, now abandoned, and a continuation-in-part of application No. 12/241,319, filed on Sep. 30, 2008, and a continuation-in-part of application No. 12/241,327, filed on Sep. 30, 2008, and a continuation-in-part of application No. 12/241,342, filed on Sep. 30, 2008, now Pat. No. 8,041,435.

(51) Int. Cl.
 *G05B 19/042* (2006.01)
 *G05B 19/05* (2006.01)

(52) U.S. Cl.
 CPC ............... *G05B2219/13063* (2013.01); *G05B 2219/23389* (2013.01); *G05B 2219/32137* (2013.01); *G05B 2219/36174* (2013.01)

(56) References Cited

U.S. PATENT DOCUMENTS

| | | | |
|---|---|---|---|
| 5,530,861 A | 6/1996 | Diamant et al. | |
| 5,812,394 A | 9/1998 | Lewis et al. | |
| 5,907,704 A | 5/1999 | Gudmundson et al. | |
| 5,946,681 A | 8/1999 | Shorter | |
| 6,067,299 A | 5/2000 | DuRee | |
| 6,085,222 A | 7/2000 | Fujino et al. | |
| 6,104,962 A | 8/2000 | Sastry | |
| 6,154,684 A | 11/2000 | Schwenke et al. | |
| 6,167,383 A | 12/2000 | Henson | |
| 6,269,254 B1 | 7/2001 | Mathis | |
| 6,437,805 B1 | 8/2002 | Sojoodi et al. | |
| 6,477,435 B1 | 11/2002 | Ryan et al. | |
| 6,505,247 B1 | 1/2003 | Steger et al. | |
| 6,539,271 B2 | 3/2003 | Lech et al. | |
| 6,553,268 B1 | 4/2003 | Schwenke et al. | |
| 6,615,166 B1 | 9/2003 | Guheen et al. | |
| 6,618,856 B2 | 9/2003 | Coburn et al. | |
| 6,718,533 B1 | 4/2004 | Schneider et al. | |
| 6,868,538 B1 | 3/2005 | Nixon et al. | |
| 7,016,759 B2 | 3/2006 | Kaever et al. | |
| 7,020,697 B1 | 3/2006 | Goodman et al. | |
| 7,043,311 B2 | 5/2006 | Nixon et al. | |
| 7,058,712 B1 * | 6/2006 | Vasko et al. | 709/224 |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 7,146,232 B2 | 12/2006 | Staron et al. | |
| 7,159,007 B2 | 1/2007 | Stawikowski et al. | |
| 7,194,446 B1 | 3/2007 | Bromley et al. | |
| 7,197,493 B2 | 3/2007 | Ashby et al. | |
| 7,225,037 B2 | 5/2007 | Shani | |
| 7,233,830 B1 | 6/2007 | Callaghan | |
| 7,266,677 B1 * | 9/2007 | Bromley et al. | 713/1 |
| 7,272,815 B1 | 9/2007 | Eldridge et al. | |
| 7,363,338 B2 | 4/2008 | Kaakani et al. | |
| 7,395,122 B2 | 7/2008 | Kreidler et al. | |
| 7,418,305 B2 | 8/2008 | Buesgen et al. | |
| 7,505,817 B2 | 3/2009 | McDaniel et al. | |
| 7,509,249 B2 | 3/2009 | Britt et al. | |
| 7,627,385 B2 | 12/2009 | McGreevy et al. | |
| 7,653,008 B2 | 1/2010 | Patrick et al. | |
| 7,676,279 B2 | 3/2010 | Hood et al. | |
| 7,970,830 B2 | 6/2011 | Staggs et al. | |
| 7,979,488 B2 | 7/2011 | Thibault et al. | |
| 8,214,455 B2 | 7/2012 | Baier et al. | |
| 2001/0034557 A1 | 10/2001 | Hudson et al. | |
| 2001/0052113 A1 | 12/2001 | Hearne et al. | |
| 2002/0059272 A1 | 5/2002 | Porter | |
| 2002/0156548 A1 | 10/2002 | Arackaparambil et al. | |
| 2003/0023336 A1 | 1/2003 | Kreidler et al. | |
| 2003/0045950 A1 | 3/2003 | Bronikowski et al. | |
| 2003/0061274 A1 | 3/2003 | Lo | |
| 2003/0150927 A1 | 8/2003 | Rosen | |
| 2003/0163656 A1 | 8/2003 | Ganton | |
| 2004/0015568 A1 | 1/2004 | Kaakani et al. | |
| 2004/0139427 A1 | 7/2004 | Garvey | |
| 2004/0199925 A1 | 10/2004 | Nixon et al. | |
| 2004/0230328 A1 | 11/2004 | Armstrong et al. | |
| 2004/0230643 A1 | 11/2004 | Thibault et al. | |
| 2005/0027831 A1 | 2/2005 | Anderson et al. | |
| 2005/0080788 A1 | 4/2005 | Murata | |
| 2005/0125735 A1 | 6/2005 | Cohen et al. | |
| 2005/0132064 A1 | 6/2005 | Lo | |
| 2005/0229004 A1 | 10/2005 | Callaghan | |
| 2005/0234873 A1 | 10/2005 | Milligan | |
| 2005/0256735 A1 | 11/2005 | Bayne | |
| 2006/0031855 A1 | 2/2006 | Smithline | |
| 2006/0037008 A1 | 2/2006 | Stelzer et al. | |
| 2006/0059127 A1 | 3/2006 | Berry et al. | |
| 2006/0179032 A1 | 8/2006 | Gottsman et al. | |
| 2006/0206448 A1 | 9/2006 | Hyder et al. | |
| 2006/0212146 A1 | 9/2006 | Johnson et al. | |
| 2006/0259954 A1 * | 11/2006 | Patrick | 726/2 |
| 2006/0271505 A1 | 11/2006 | Vierich et al. | |
| 2006/0277289 A1 | 12/2006 | Bayliss et al. | |
| 2007/0011281 A1 | 1/2007 | Jhoney et al. | |
| 2007/0055757 A1 | 3/2007 | Mairs et al. | |
| 2007/0073850 A1 | 3/2007 | Callaghan et al. | |
| 2007/0089063 A1 | 4/2007 | Breyer | |
| 2007/0124475 A1 | 5/2007 | Syed et al. | |
| 2007/0142941 A1 | 6/2007 | McGreevy et al. | |
| 2007/0250630 A1 | 10/2007 | Blanding | |
| 2007/0256051 A1 | 11/2007 | Rojer | |
| 2008/0022151 A1 | 1/2008 | Stange et al. | |
| 2008/0040477 A1 | 2/2008 | Johnson et al. | |
| 2008/0079558 A1 | 4/2008 | Dorgelo et al. | |
| 2008/0082186 A1 | 4/2008 | Hood et al. | |
| 2008/0082577 A1 | 4/2008 | Hood | |
| 2008/0082636 A1 * | 4/2008 | Hofmann et al. | 709/220 |
| 2008/0082959 A1 | 4/2008 | Fowler et al. | |
| 2008/0092131 A1 | 4/2008 | McIntyre et al. | |
| 2008/0120367 A1 | 5/2008 | Thibault et al. | |
| 2008/0127065 A1 | 5/2008 | Bryant et al. | |
| 2008/0133700 A1 | 6/2008 | Thibault et al. | |
| 2008/0140230 A1 | 6/2008 | Bromley | |
| 2008/0201297 A1 | 8/2008 | Choi et al. | |
| 2008/0208361 A1 | 8/2008 | Grgic | |
| 2008/0208368 A1 | 8/2008 | Grgic | |
| 2008/0222276 A1 | 9/2008 | Thibault et al. | |
| 2008/0284649 A1 | 11/2008 | Bratthall et al. | |
| 2009/0083705 A1 | 3/2009 | Phillips et al. | |
| 2009/0083843 A1 | 3/2009 | Wilkinson et al. | |
| 2009/0094326 A1 | 4/2009 | Thibault et al. | |
| 2009/0328012 A1 | 12/2009 | Aharoni et al. | |
| 2010/0088104 A1 | 4/2010 | DeRemer et al. | |
| 2010/0192125 A1 | 7/2010 | Son et al. | |

FOREIGN PATENT DOCUMENTS

| | | |
|---|---|---|
| DE | 19614789 C1 | 9/1997 |
| DE | 101 29 564 A1 | 9/2002 |
| EP | 1276026 A | 1/2003 |
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |
| WO | 02/31607 A | 4/2002 |
| WO | 2004086160 A1 | 10/2004 |

OTHER PUBLICATIONS

Article entitled "Automation Today", by Rockwell, dated Feb. 2001.*
Article entitled "ViewAnyWare" by Rockwell, dated Jun. 10, 2004.*
Article entitled "ViewAnyWare: Picture the Reaility" by Rockwell, Copyright 2004.*

(56) References Cited

OTHER PUBLICATIONS

OA dated Mar. 22, 2011 for U.S. Appl. No. 12/241,319, 23 pages.
OA dated Feb. 24, 2011 for U.S. Appl. No. 12/241,342, 35 pages.
OA dated May 10, 2011 for U.S. Appl. No. 11/536,791, 46 pages.
OA dated Oct. 24, 2011 for U.S. Appl. No. 11/536,791, 35 pages.
OA dated Jan. 25, 2012 for U.S. Appl. No. 12/241,327, 45 pages.
OA dated Dec. 16, 2010 for U.S. Appl. No. 11/536,818, 50 pages.
European Search Report for European Patent Application No. EP07117140, dated May 7, 2008, 8 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.
OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA Dated Jan. 9, 2009 for U.S. Appl. No. 11/536,827, 18 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
European Search Report dated Nov. 20, 2009 for European Application No. EP 07 11 7192, 9 pages.
"SIMATIC, Working with STEP V5.1, Edition Aug. 2000, A5E00069681-03". Aug. 2000, Siemens, D-90327, Nurnberg, DE, XP002554626.
Fayad, et al. "HMI as a Maintainance tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragrap—p. 133, last paragraph.
OA dated Jan. 26, 2010 for U.S. Appl. No. 11/536,791, 39 pages.
OA dated Mar. 8, 2010 for U.S. Appl. No. 11/536,760, 19 pages.
OA dated Mar. 8, 2010 for U.S. Appl. No. 11/536,746, 21 pages.
Raymond Staron, et al. Use of an Agent Type Library for the Design and Implementation of Highly Flexible Control Systems. Last accessed on Oct. 10, 2008, 6 pages.
Marvin J. Schwenke, et al. Specifying a Control Program with High Level Graphical Editors. (c) 2001 Society of Automotive Engineers, Inc. Last accessed on Oct. 10, 2008, 9 pages.
Marvin J. Schwenke, et al. Use of a Type Library to Speed Up PLC Program Design and Commissioning. Last accessed on Oct. 10, 2008, 13 pages.
European Search Report for European Application No. 09171807.2-1238 dated Feb. 4, 2008, 7 pages.
European Search Report on European Patent Application No. EP09171802.3-1238, dated Jan. 29, 2010, 6 pages.
European Search Report for European Application No. 09171806.4-1238 dated Apr. 2, 2010, 8 pages.
European Search Report dated Jan. 25, 2010 for European Application No. EP09171807, 2 pages.
OA dated May 14, 2010 for U.S. Appl. No. 11/536,715, 49 pages.
"Datastream 7i for SQL Server"; Jun. 13, 2006, Infor, 2 pages.
European Search Report Dated Jan. 21, 2010 for European Application No. EP09171802, 2 pages.
European Search Report Dated Jan. 27, 2010 for European Application No. EP09171806, 2 pages.
OA dated Sep. 17, 2010 for U.S. Appl. No. 12/241,319, 32 pages.
OA dated Aug. 2, 2012 for U.S. Appl. No. 12/893,366, 50 pages.
Office Action dated Jul. 19, 2013 for U.S. Appl. No. 12/241,319, 42 pages.
Office Action dated Sep. 30, 2013 for U.S. Appl. No. 12/893,550, 48 pages.
Notice of Allowance dated Sep. 13, 2013 for U.S. Appl. No. 12/893,804, 25 pages.
OA dated Apr. 25, 2013 for U.S. Appl. No. 12/893,804, 39 pages.
OA dated Feb. 1, 2013 for U.S. Appl. No. 12/893,366, 20 pages.
Office Action dated Dec. 5, 2013 for U.S. Appl. No. 12/893,883, 58 pages.
Office Action dated Feb. 13, 2014 for U.S. Appl. No. 12/241,319, 24 pages.
Office Action dated Jul. 17, 2014 for U.S. Appl. No. 12/893,366, 26 pages.
Final Office Action dated Sep. 4, 2014 for U.S. Appl. No. 12/893,883, 31 pages.

\* cited by examiner

MULTIPLE MACHINE INTERFACE

CROSS-REFERENCE TO RELATED APPLICATIONS

This application is a Continuation-in-Part of co-pending U.S. patent application Ser. No. 11/536,715, entitled "MODULE STRUCTURE AND USE FOR INDUSTRIAL CONTROL SYSTEMS," filed on Sep. 29, 2006; this application is also a Continuation-in-Part of co-pending U.S. patent application Ser. No. 11/536,746, entitled "HMI VIEWS OF MODULES FOR INDUSTRIAL CONTROL SYSTEMS," filed on Sep. 29, 2006; this application is also a Continuation-in-Part of co-pending U.S. patent application Ser. No. 11/536,760, entitled "MODULE AND CONTROLLER OPERATION FOR INDUSTRIAL CONTROL SYSTEMS," filed on Sep. 29, 2006; this application is also a Continuation-in-Part of co-pending U.S. patent application Ser. No. 11/536,791, entitled "MODULE CLASSIFICATION AND SEARCHING FOR INDUSTRIAL CONTROL SYSTEMS," filed on Sep. 29, 2006; this application is also a Continuation-in-Part of co-pending U.S. patent application Ser. No. 12/241,319, entitled "MODULE AND HOST MATCHING," filed on Sep. 30, 2008; this application is also a Continuation-in-Part of co-pending U.S. patent application Ser. No. 12/241,327, entitled "MODULE PUBLICATION AND DISCOVERY," filed on Sep. 30, 2008; this application is also a Continuation-in-Part of co-pending U.S. patent application Ser. No. 12/241,342, entitled "MODULE DYNAMIC HOSTING," filed on Sep. 30, 2008, the entireties of which are incorporated herein by reference.

TECHNICAL FIELD

The subject disclosure relates generally to industrial control systems and more particularly to modular automation within industrial control systems.

BACKGROUND

Industrial control systems can employ complex mechanical, electronic, electro-mechanical, and/or robotic machinery to perform various automated mechanical and/or electrical functions. Examples of machinery include industrial motors, pumps, conveyors, escalators, drills, refrigeration systems, and so forth. An industrial control system can utilize one or more control devices to activate or deactivate the machinery and/or to determine an appropriate level of activation for the machinery (e.g., an amount of current to supply to a variable input motor). Additionally, the control devices can be associated with logical program code that determines an appropriate time, degree, manner, and other criteria for operation of the machinery. For example, the determination can be based on various circumstances, including an output of another device, a reading of an optical sensor, an electronic measurement, a movement, a number of rotations of a device, and so on.

The machinery can be controlled by at least one industrial controller, such as, for example, programmable logic controllers. The industrial controllers can also communicate with higher level computing systems or servers that aggregate data from the controllers and help to manage day-to-day activities of an enterprise. As systems have become more complex, however, communications and functional cooperation between components of the industrial automation system has become a challenge. For instance, when users purchase multiple products from one or more vendors, there is often limited interoperability and consistency between such products. Software and control engineers must then learn each product and how the components interact with each other. Limited product and component consistency suggest that techniques engineers learn for one product do not necessarily carry over to other implementations.

Often, integration of products in the industrial automation system is complex and difficult to manage. Process and control engineers cannot easily code and configure their respective components without concern for other system components, which may have different manufacturers and different platforms.

Another problem with integration of products is that process and control engineers focus on underlying technical details, including implementation and glue logic, rather than the application level concerns, for example process information. For instance, an engineer may decide to automate a manual section of their plant. The design may start at a high level but soon becomes a series of discussions regarding nonfunctional requirements e.g., distributed component object model (DCOM), transmission control protocol (TCP), transaction rates, and the like. While these nonfunctional requirements are important, the design of functional requirements is where the true value is to the designer or end user. Thus, the engineer would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU (central processing unit) cycles, and so forth) and application coupling. For instance, processing load should be distributed across the system in accordance with system capabilities. Thus, if one part of the system is shut down, alternative processing capability should be in place to allow production to continue. For example, control and process engineers can initially design and install a control system suiting their immediate needs. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and can reduce the ability to configure such systems.

SUMMARY

The following presents a simplified summary in order to provide a basic understanding of some aspects of the subject disclosure. This summary is not an extensive overview and it is not intended to identify key or critical elements of all aspects nor delineate the scope of any or all aspects. The sole purpose of this summary is to present some concepts of one or more aspects in a simplified form as a prelude to the more detailed description that is presented later.

An aspect relates to a device comprising an interface component that provides a set of functional connections and controls for a plurality of automated host implementations. The device also comprises a deployment component that supports a plurality of platform configurations that interact with the plurality of automated host implementations. Functionality of the deployment component is independent of the plurality of platform configurations. The plurality of automated host implementations comprise at least one service, at least one reusable definition, and at least one specification. The interface component can facilitate exchange of external data. The device can be used on at least two hosts that are functional equivalents.

In accordance with some aspects, the visibility component seals at least a portion of a platform configuration included in the plurality of platform configurations. According to some aspects, the deployment component aggregates two or more platform configurations to create a composite platform configuration. The deployment component can transfer its interface intact to an aggregate deployment component, wherein the interface is exposed as a part of the aggregate deployment component. The deployment component supports multiple interfaces to enable grouping and namespace separation Another aspect relates to a method comprising providing functional connections and controls for a plurality of automated host implementations and supporting a plurality of platform configurations that interact with the plurality of host implementations. Each platform configuration is supported individually to allow updates to one platform configuration without affecting a second platform configuration. In accordance with some aspects, method comprises aggregating a first service associated with the first platform configuration and a second service associated with the second platform configuration to create an aggregated service.

A further aspect relates to a system comprising a host that executes at least one service and an interface component that provides functional connections and controls for an automated implementation of the host. The system also comprises a deployment component that supports a plurality of platform configurations that interface with the automated implementation of the host. One of the plurality of platform configurations comprises the at least one service. Also included in system is a visibility component that selectively exposes one or more subsets of functionality of the functional connections. The automated implementation of the host is execution of the at least one service.

To the accomplishment of the foregoing and related ends, one or more aspects comprise features hereinafter fully described. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component," "module," "object", "service," "system," "interface," or the like are generally intended to refer to a computer-related entity, either hardware, a combination of hardware and software, software, or software in execution. For example, a component can be, but is not limited to being, a process running on a processor, a processor, a hard disk drive, multiple storage drive (of optical and/or magnetic storage medium), an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Figure 1:
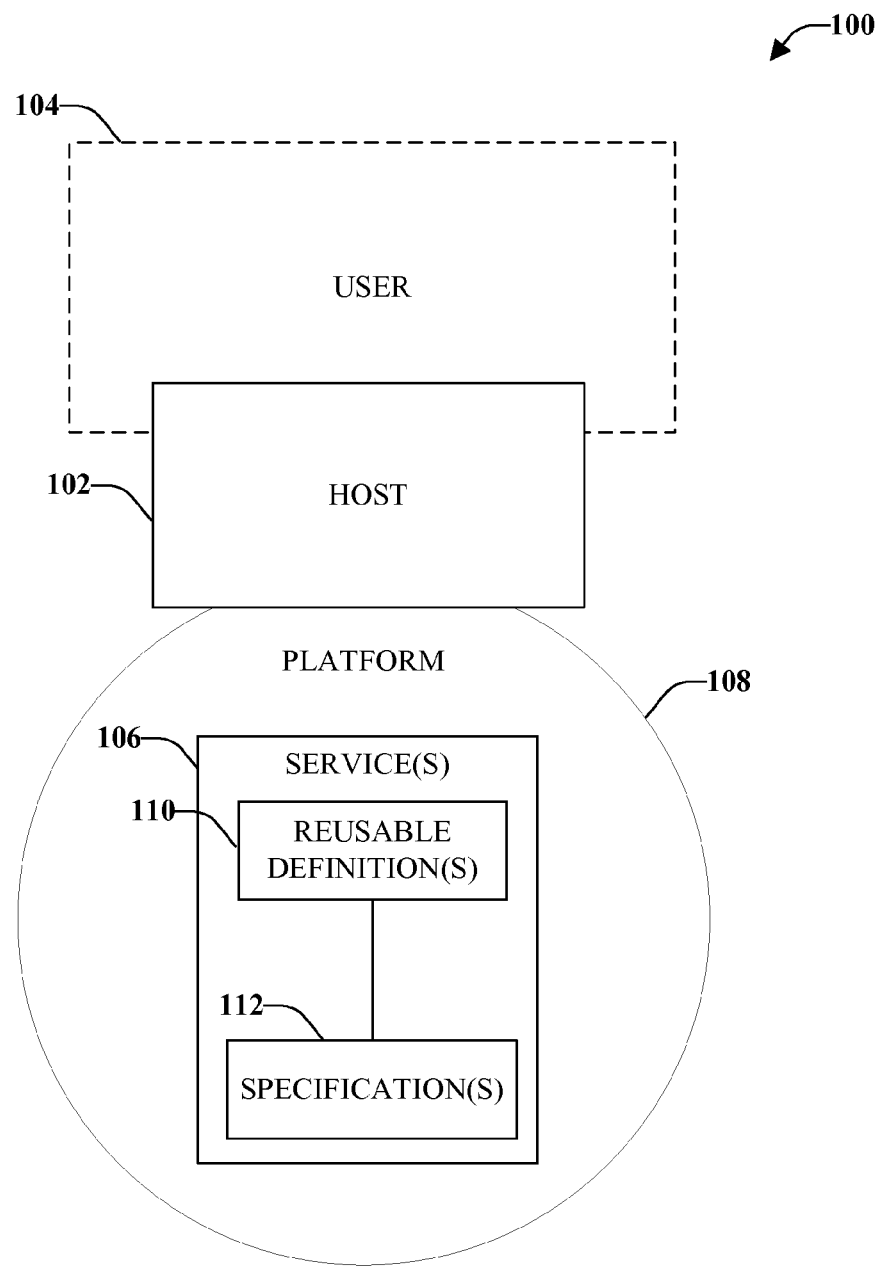
FIG. 1 is a block diagram illustrating interaction of a service and a host in an industrial automation system.

Referring initially to FIG. 1, illustrated is an example industrial automation system 100, according to an aspect. The industrial automation system 100 is configured to utilize modular automation to construct applications with reusable software that exposes functionality of components of the industrial automation system 100, while providing an abstraction from details of communication and interaction with such components.

The industrial automation system 100 includes a host 102 that is configured to interface with a user and/or entities (e.g., the Internet, another system, a computer, and so forth), hereinafter referred to as user 104. The interface between host 102 and user 104 can be through various interface mechanisms, including a human machine interface (HMI) or a graphical user interface (GUI). Although only a single host 102 is illustrated, industrial automation system 100 can include two or more hosts, according to an aspect. According to some aspects, the host 102 can be one or more industrial controllers (e.g., programmable automation controller (PAC), programmable logic controller (PLC), and so forth). The one or more industrial controllers can be associated with one or more human machine interfaces (HMIs). The term "industrial controller" as utilized herein can include functionality that can be shared across multiple components or networks.

The host 102 need not be limited to an industrial controller. According to some aspects, the host 102 can be (or can be associated with) one or more computer or network components within the industrial automation system 100. For example, the host 102 can be a computer, a server, a client, an industrial module, a human machine interface (HMI), a graphical user interface (GUI), and so forth.

The host 102 can be configured to execute at least one service 106 based, at least in part, on input from the user 104. The service 106 is illustrated as contained within a platform 108, which can provide an interface between the host 102 and the service 106. For example, the service 106 can be an executable function for the industrial automation system 100 executed on a platform 108 of the host 102. By providing the interface between the host 102 and the service 106, the platform 108 provides a set of abstractions that enable the service 106 to be implemented (e.g., compiled and executed) in disparate hosts without modification to the service. The platform 108 can be any type of hardware, software, or combination of hardware and software that allows the service 106 to run and/or execute, for example, in some embodiments, the platform 108 can be the Java™ programming language and computing platform. For example, the platform 108 can include one or more of a computer's architecture, an operating system, one or more programming languages, or user interfaces.

The service 106 can be employed as one or more executable functions for the industrial automation system 100. In accordance with some aspects, the service 106 is a reusable template that can be utilized in the development of software for the industrial automation system 100. The software can include, for example, control programs for physical manufacturing unit operations, such as assembly applications. The physical manufacturing unit can include, for example, conveyors, mixers, packaging units, process skids, robotic cells, tanks, valve matrices, and so forth. Additionally or alternatively, the software can include higher-level programs, such as batch processing applications, supervisory applications, monitoring applications, or control programs that control aspects of the industrial automation system 100.

According to some aspects, the service 106 can include one or more module objects, encapsulated objects, control objects, and so on. The service 106 can be configured to facilitate software development by hiding internal interfaces, messages, programming code, and so forth from the user 104 while providing standard and/or generic external interface(s). In accordance with some aspects, the service 106 can simplify programming in the industrial automation system 100 by allowing the user 104 (e.g., a process and control engineer) to work with published functionality of the service 106, which can be independent of how the functionality was achieved, which can mitigate integration and maintenance requirements and reduce costs. This can increase quality, consistency, and reusability of the software by providing a standardized programming structure between various components or hosts 102 (e.g., from different manufacturers) within the industrial automation system 100.

For example, utilizing services 106 can benefit both software developers and end users. For example, utilization of services can allow a developer of control applications to concentrate on the functionality of an application rather than the mechanics of implementation, such as by separating procedure control and equipment control. Services 106 can facilitate continuous software improvements; at the same time, services 106 can mitigate the risks that changes to the software may present to the industrial automation system 100. Utilization of services, as disclosed herein can simplify testing of software, and can provide a reduced chance that new software adversely affects other components or hosts 102 within the industrial automation system 100. This can also reduce development time, accelerate design cycles, and reduce cost. Services 106 can also allow end users (e.g., manufacturers) to separate procedural control from equipment control, which can allow end users to adopt existing assets to new product requirements with minimal time and capital investment.

According to various aspects, the service 106 can separate procedural control from equipment control by employing a hierarchically structured data model (e.g., a hierarchically structured data model according to the International Society for Automation (ISA)-88 standards). In such a manner, procedural control can be logically separated from equipment control. Logical separation can enable the separation of product-specific definitions, instructions, and information from processing equipment entities.

The service 106 can be configured to hide internal aspects from a user 104. For example, the service 106 (and/or platform 108) can include or can be associated with an interface. In accordance with some aspects, the interface can be located within the host 102. The interface can hide internal functions of the service 106, including the underlying code and complexity. According to an embodiment, the interface can define external behaviors supplied to at least one client application engaging the service 106. Through the interface, the service 106 can expose data, expose operations that can be performed, expose dependencies on other services, and so forth. The interface can allow the service 106 to connect to at least one other service to engage with a client application, according to an aspect. For example, an industrial process can be defined with a plurality of services, wherein a first service is a control service that controls a second service (e.g., equipment service) and a third service (e.g., material service), wherein the third service is subordinate to the second service. It is to be appreciated that the service 106 can support more than one interface, for example, to engage with more than one client application or to logically partition the functionality of the service. In some aspects, a single interface can support a plurality of clients. Separation of a service into multiple interfaces can allow one interface to be extended and/or changed without impacting other interface areas. Such separation can mitigate the overall impact to areas of an industrial automation system that utilize the unchanged interface, but not the changed interface.

The interface can hide internal functions of the service 106. These internal functions can include one or more reusable definitions 110 and one or more specifications 112. In accordance with some aspects, the service 106 can be an association of one or more reusable definitions 110 with one or more specifications 112. The one or more reusable definitions 110 can include program code that can alter the state of one or more resources in an industrial automation system (e.g., logic code that can control opening and closing of a valve). The one or more reusable definitions 110 can include programming code, for example, ladder logic, function chart, script, Java™ C code, and so on. The one or more specifications 112 can include the one or more resources. The one or more resources can include one or more of equipment, material, personnel, segments, storage, and so forth. For example, the resource may be a valve that is opened or closed according to logic code.

In accordance with some aspects, the programming code of the reusable definition 110 can be in a different physical location from the resource of the specification 112 within an enterprise resource control (ERC) system. It is to be appreciated that the service 106 can support more than one reusable definition 110. According to some aspects, different reusable definitions 110 can be targeted for different hosts such that a service 106 with more than one reusable definition 110 can be deployed to more than one host 102 where each host may have different computing capabilities and methods.

The service 106 can include external references (not illustrated) that can maintain metadata pertaining to the service 106, according to an aspect. For example, the external references can include information that describes dependencies of the service 106, required dependencies to support the reusable definitions 110 (e.g., operational requirements). The external references can also include, for example, specific qualities (e.g., performance, reliability, physical characteristics, and so forth) of the service 106 and/or security aspects (e.g., security rules and automatic application thereof, or authentication procedures) of the service 106. The service 106 may also include other portions (not shown), such as local data, visualization elements, etc. Alternatively, a service 106 may be more limited in nature (e.g., only including a single specification 112).

Figure 2:
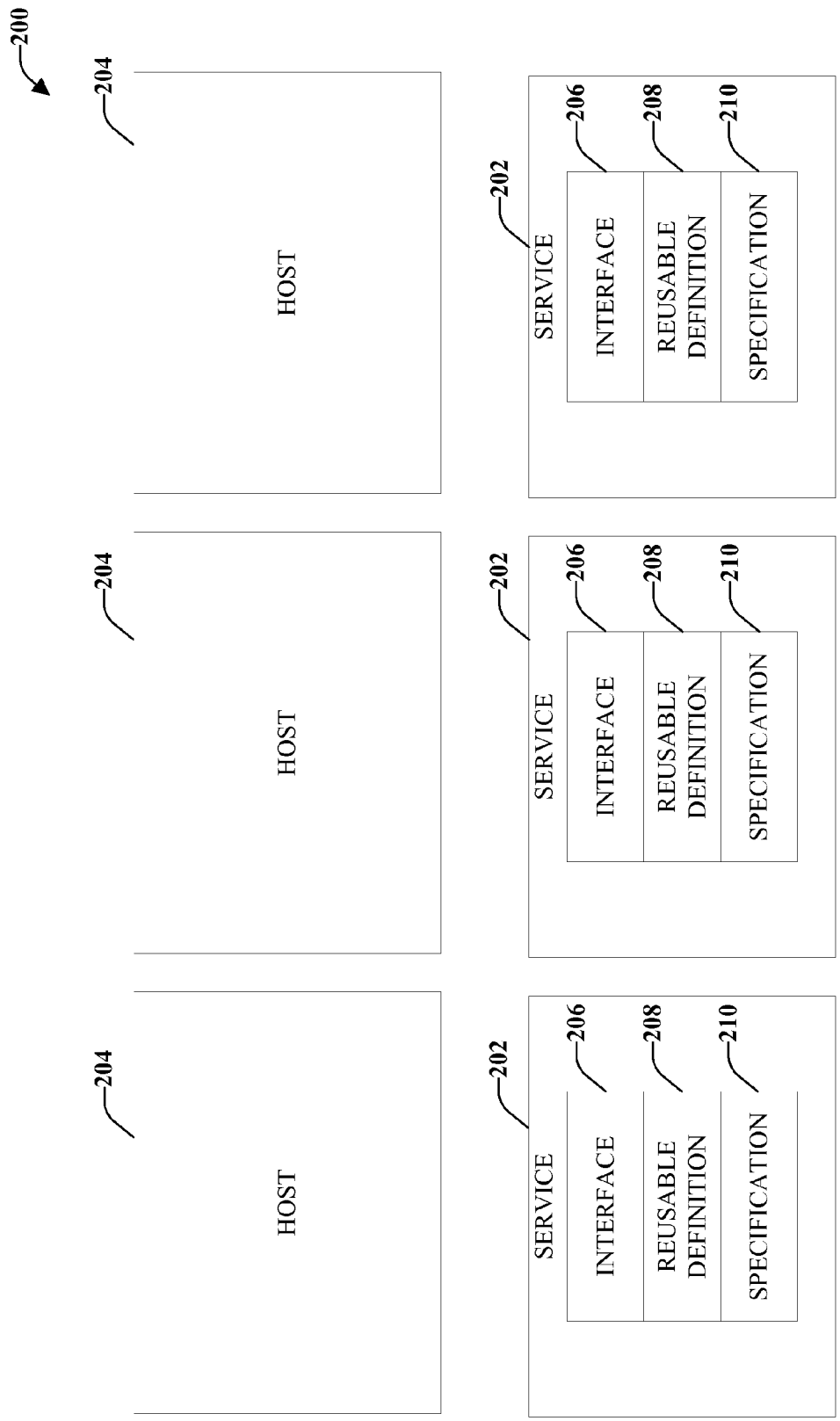
FIG. 2 is a block diagram illustrating a system that utilizes services and hosts.

FIG. 2 illustrates an example system 200, according to an aspect. System 200 can be a portion of an industrial control configuration of an industrial automation system. Included in system 200 are services 202 (e.g., modular objects, encapsulated objects, control objects, etc.) that can exist in conjunction with a one or more hosts 204 upon an industrial control configuration. For example, the services 202 can exist in conjunction with the hosts 204 through an interface 206. Functionality related to the services 202 can be similar to plug-in approaches in software. For example, services 202 can be connected to control a process in the industrial control environment. Services 202 can be customizable and reusable, for example, among multiple users, multiple locations, multiple platforms, and/or multiple hosts 204.

The services 202 can grow into different layers of an organizational hierarchy to form a service oriented control system. For example, an industrial process can be defined with a plurality of services 202, wherein one service is a control service, which controls an equipment service and a material service, wherein the material service is subordinate to the equipment service.

Generally, the service 202 is an association of one or more reusable definitions 208 with one or more specifications 210. Reusable definitions 208 can include program code that can alter a state of one or more resources in the industrial control environment. For example, the reusable definitions 208 can be at least one of logic code, including ladder logic, function chart, script, Java™, C code, and the like. It is to be appreciated that a service 202 can support multiple reusable definitions 208 (e.g., to engage with multiple hosts 204). The one or more specifications 210 can include the one or more resources. The one or more resources can include one or more of equipment, material, personnel, segments, storage, and the like. For example, the resource may be a valve that is opened or closed according to logic code.

Similar to a plug-in approach in software, a service 202 can hide internal aspects (e.g., reusable definitions 208 and specifications 210) from a user. The service 202 can hide these aspects by providing standard and/or generic interfaces 206 to external systems. According to an embodiment, the interface 206 can allow the service 202 to expose external reference information about the service 202. For example, the external reference information can include information describing dependencies of the service 202, required connections to support the reusable definition 208, and the like. The service 202 can support multiple interfaces 206, which can allow the service 202 to engage with multiple hosts 204.

According to an embodiment, users and/or hosts 204 can access the services 202 across a network (not shown). The network may include, for example, any public or private network. For example, services 202 can be created in an offline manner, such as in a computer database (not shown). When created offline, the services 202 can be downloaded for execution on the hosts 204.

Figure 3:
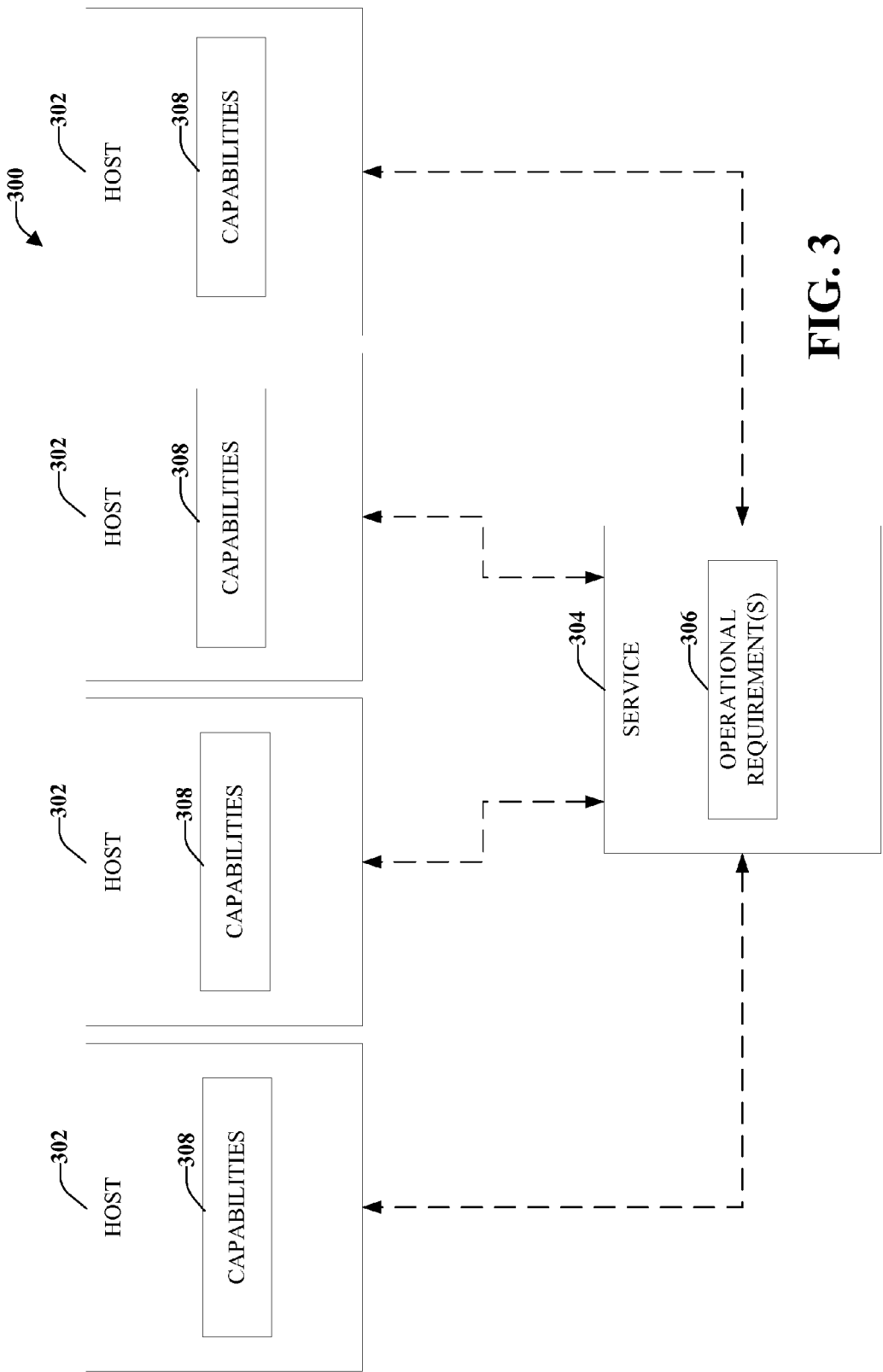
FIG. 3 is a block diagram illustrating a system for matching services and hosts.

FIG. 3 illustrates an example system 300 for expressing matching among hosts 302 and a service 304. The service 304 can have one or more operational requirements 306. For example, the operational requirements 306 can be that a host should have a high resolution size and a large memory. Hosts 302 can have different capabilities 308 that can be exploited by the service 304. A binding (represented with a dotted line) can be created with a host in an attempt to match one or more operational requirement 306 with one or more capabilities 308. If more than one host 302 includes one or more capabilities 308 that match one or more operational requirements 306 of a service 304, then multiple bindings can be created and/or selection of a single host can occur and one binding can be used. If no host 302 has a capability 308 matching an operational requirement 306 of the service 304, then an error message can be generated. In accordance with some aspects, if there are no current hosts 302 that match an operational requirement 306, periodic or continuous observation of the environment can occur to detect when a new host 302 that has the required capability 308 enters the environment. The periodic or continuous monitoring can also occur to detect modifications to an existing host 302 to determine when the host 302 has been modified and now meets at least one operational requirement 306 of the service 304.

Figure 4:
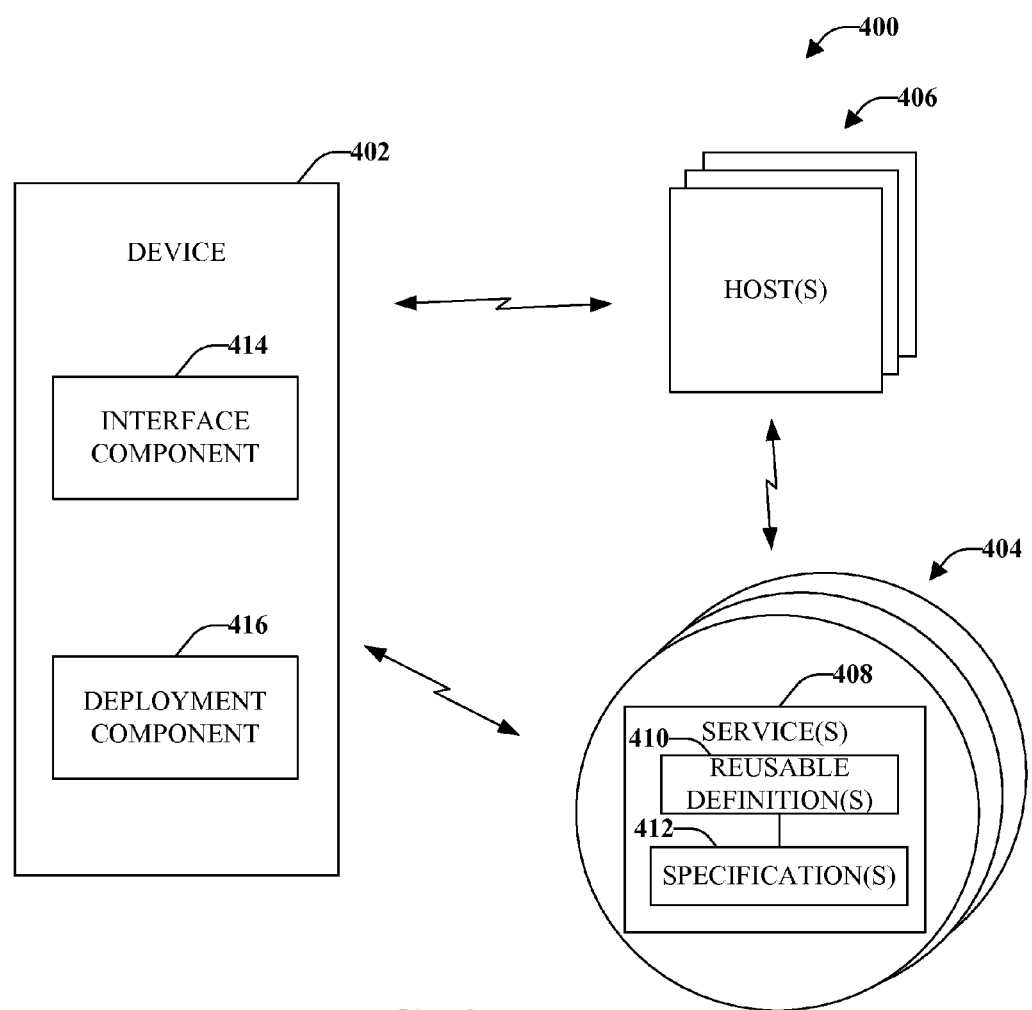
FIG. 4 illustrates an example industrial control system that supports multiple platform configurations, according to an aspect.

FIG. 4 illustrates an example industrial control system 400 that supports multiple platform configurations, according to an aspect. Support of multiple interfaces associated with multiple services and related platform configurations enables grouping and namespace separation. Multiple platform configurations can also support visibility controls, which can allow different users access to different sets of controls and objects. Platform configurations can be tagged to provide different functionality depending on the intended use of the platform configurations. Multiple platform configurations also enable scalable updating. Traditionally, the entire industrial control system is updated in response to changes in implementation of one or more of software, hardware, or firmware, necessary to operate the industrial system. However, with the one or more disclosed aspects, service(s) and associated platform configuration(s) are decoupled, which allows individual platform configurations to be revisioned (e.g., updated) separately. The decoupled platform configuration(s) allow each platform configuration to be reused with different implementations (e.g., implementation of software or firmware) and objects. Additionally or alternatively, the platform configuration(s) can reuse specific methods in which reusable definitions contain only the definitions of operation. This is a more granular approach than the approach traditionally performed (e.g., where whole services are reused).

Included in industrial control system 400 is a device 402 that interacts with multiple platform configurations 404. Each of the different platform configurations 404 can be utilized with different host(s) 406 within the industrial control system 400 (or within a related architecture). In accordance with some aspects, a single host 406 is utilized with multiple platform configurations 404. Although various aspects herein illustrate connections between device 402, platform configurations 404, and host(s) 406 as wireless links, according to some aspects, the links can be wireline links, or both wireless and wireline links, or might be on the same physical machine and use memory or other techniques suitable for communication.

The multiple platform configurations 404 can include one or more services 408 associated with one or more reusable definitions 410 and/or one or more specifications 412. In accordance with some aspects, different platform configurations 404 can use a common service 408, a common reusable definition 410, a common specification 412, or combinations thereof. Each component (e.g., service, reusable definition, specification) of the platform can be located anywhere within an industrial control system 400 and does not need to be co-located with other components of the platform and/or the host(s) 406.

Device 402 comprises an interface component 414 that is configured to provide a set of functional connections and controls for various automated host implementations, wherein the automated host implementations are configured to interact with a plurality of platform configurations. In accordance with some aspects, the automated implementation of the host is execution of a service that comprises a reusable definition and a specification. Interface component 414 can provide a mechanism for interaction between a user and/or entity (e.g., the Internet, another system, a computer, and so on, hereinafter referred to as user), the one or more hosts 406, and the multiple platform configurations 404. For instance, the interface component 414 can be, but is not limited to being, a keyboard, a mouse, a pressure-sensitive screen, a graphical user interface, a microphone, and voice recognition software. In accordance with some aspects, the one or more hosts 406 and the device 402 can be in separate locations within the industrial control system 400 or another location (e.g., satellite plant, vendor location, client location, and so forth).

In accordance with some aspects, device 402 is configured to be utilized for one host 406, wherein the device 402 is independent of the implementation and is transparent to the end user. In such a manner, device 402 can be reused on multiple hosts that are functional equivalents but that may have fundamental underlying differences. Thus, logic can be implemented in different languages, different software bases, and so forth.

Also included in device 402 is a deployment component 416 that is configured to support a plurality of platform configurations 404. Further, the deployment component 416 can be functionally independent of the platform configurations 404. For example, deployment component 416 can be configured to be reused on multiple platform configurations that are functional equivalents, but have underlying differences. For example, at least one multiple platform configuration can have a different programming language than at least one other of the multiple platform configurations. However, even though the platform configurations have different programming languages, the deployment component 416 is configured to support both languages and, therefore, both platform configurations. In accordance with some aspects, deployment component 416 does not support each individual language but instead utilizes a high-level programming code that can interface with multiple programming languages without being programming language specific.

Additionally or alternatively, deployment component 416 can be configured to support platform configurations having different implementations. For example, one implementation can be in an industrial automated controller and a second implementation can be in a software system. The support of different implementations can allow an end application to be indifferent or unbound to a current implementation on another end application.

According to some aspects, deployment component 416 can be configured to capture a command or action regardless of how the command or action is used. For example, an action might be that if a certain condition occurs, an alarm (e.g., a specification) is activated. A similar specification (e.g., alarm) can be employed when a different event occurs. Even though a similar specification (e.g., alarm) is used in both cases, the deployment component 416 allows the reusable definition to interact with the specification (e.g., alarm) even though the specification is being utilized differently by two different automated host implementations. In such a manner, at least one service can comprises a plurality of reusable definitions supported by at least two automated host implementations, wherein the at least one service interfaces with the at least two host implementations.

In accordance with some aspects, deployment component 416 can aggregate one or more services 408, one or more reusable definitions 410, and/or one or more specifications 412. The aggregation can include identifying two or more services, two or more reusable definitions, and/or two or more specifications that are similar and determining that the similar services, reusable definitions, and/or specifications can be aggregated or utilized interchangeably. In accordance with some aspects, deployment component 416 aggregates based at least in part on a language requirement of an implementation of the at least one service. According to some aspects, deployment component 416 aggregates based at least in part on metadata related to an implementation of the at least one service. In some aspects, deployment component 416 aggregates based at least in part on an analysis of the at least one of a plurality of capabilities. In additional or alternative aspects, deployment component 416 aggregates in response to definition of user-specific configuration of industrial control system 400.

Aggregation of a group of services results in a composite service, or composite object. The composite service includes at least one interface from each of the services in the group of services. As indicated supra, deployment component 416 can aggregate the group of services. In addition, in certain embodiments, deployment component 416 can manage the at least one interface of each of the services in the group of services. The management can be effected in accordance with two approaches: (1) Compact. The set of interfaces spanned by the at least one interface of each of the services in the group of services can form the composite service with a single, compact interface associated with the composite service. In this approach, at least a sub-set of one or more interface(s) in the set of interfaces are hidden and not available to users (machine or human agent) disjointedly from, or outside, the composite service. (2) Loose. Each interface in the set of interfaces spanned by the at least one interface of each of the services in the group of services is transferred intact into the composite service. Such set of interfaces embody the interface of the composite service; the composite service retains the interface(s) in the set of interfaces as individual entities. Each interface can be exposed as part of formation of the composite service, but remains hidden otherwise. Aggregate modules can enable a control module to contain a simple module that performs logic execution and a simple module that performs HMI. The aggregate modules can be connected together internally.

Figure 5:
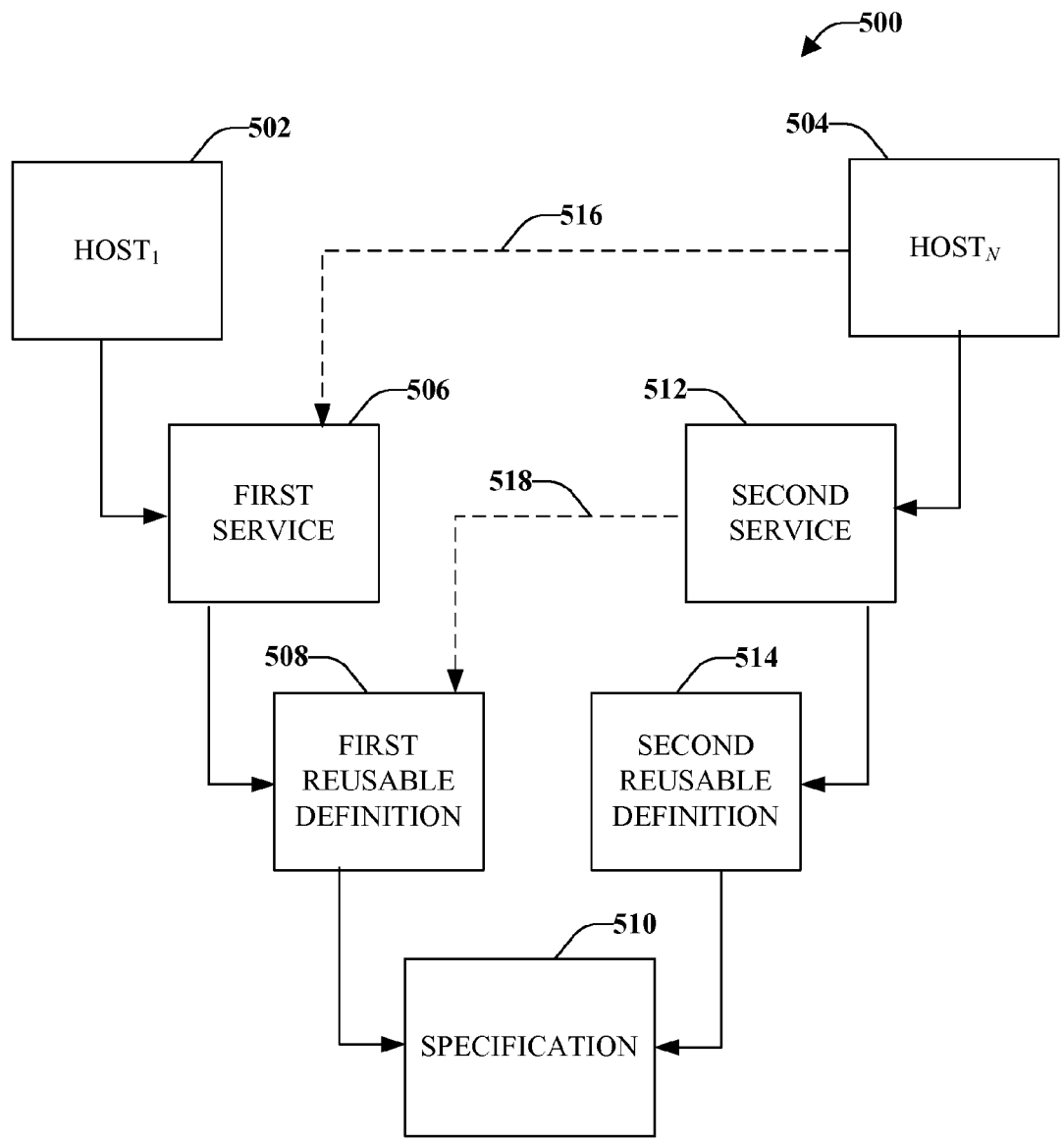
FIG. 5 illustrates a schematic representation of an example group of alternative platform configurations, according to an aspect.

In order to visualize a group of alternative platform configuration possibilities and/or aggregation of at least a portion of platform configurations, FIG. 5 illustrates a schematic representation 500 of an example group of alternative platform configurations, according to an aspect. Illustrated in the schematic representation 500 are multiple hosts, labeled Host$_1$ 502 and Host$_N$ 504, where N is an integer equal to or greater than one. Host$_1$ 502 can utilize a first service 506, which utilizes a first reusable definition 508, which utilizes a specification 510 (e.g., creating a platform configuration that comprises service 506, reusable definition 508, and specification 510). In a similar manner, Host$_N$ 504 can utilize a second service 512, which utilizes a second reusable definition 514, which utilizes the specification 510. However, in accordance with some aspects, another possibility for a platform configuration is that Host$_N$ 504 can utilize first service 506 as indicated at 516. In a similar manner, Host$_1$ 502 can alternatively utilize second service 512. Further second service 512 might alternatively utilize first reusable definition 508, as indicated at 518. In a similar manner, first service 506 might alternatively utilize second reusable definition 514. In accordance with some aspects, a host might utilize more than on service, more than one reusable definition, one or more specifications, or combinations thereof.

Figure 6:
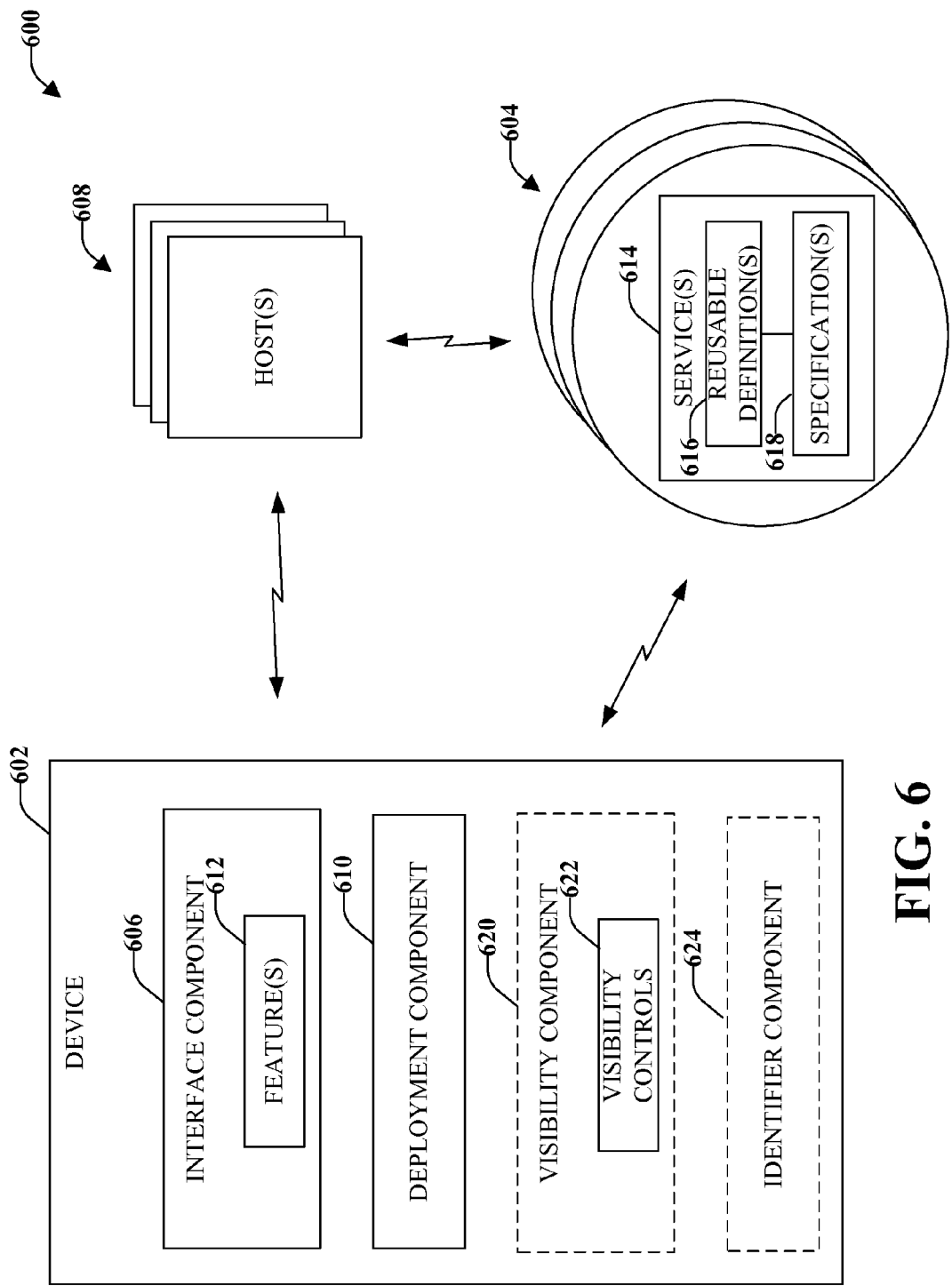
FIG. 6 illustrates a more detailed view a system that comprises a device that employs multiple platform configurations, according to an aspect.

With reference now to FIG. 6, illustrated is a more detailed view a system 600 that comprises a device 602 that employs multiple platform configurations 604, according to an aspect. Device 602 comprises an interface component 606 that is configured to provide a set of functional connections and controls for various automated host implementations. Also included in device 602 is a deployment component 610 that is configured to support multiple platform configurations 604. Deployment component 610 is configured to support of multiple interfaces associated with multiple services and related platform configurations, which can enable grouping and namespace separation. In accordance with some aspects, deployment component 610 supports each of the multiple interfaces individually, which can enable updating of a first interface without affecting the other interfaces. Further, each interface can be updated without requiring the entire service and/or related platform configuration to require updating.

Interface component 606 can provide various features 612, such as event processing, which can include data generation. For example, an interface component associated with a service 614 can trigger "events" on an exception basis. These events can be accompanied by a payload and/or data generation. In some aspects, the events can be discovered by the interface component of another service and can be pushed to the inside of the service for processing. Another feature 612 can be bi-directional interaction. For example, interface component 606 can provide information to a service 614 (e.g., a desired action), for example, and receive information back from the service 614 (e.g., information related to a reusable definition 616 and/or a specification 618).

Another feature 612 of interface component 606 can be the support of point to point and publication, such as one or more communication mechanisms that facilitate the exchange of external data. For example, external data can be supplied to interface component 606 (e.g., from a host 608). Based on the external data, interface component 606 can provide a set of functional connections (e.g., platform configuration) and can output (e.g., visual, audible) information related to the set of functional connections in the form of a publication to a user, which can be output though an interaction with at least one host.

Also included in device 602 is a visibility component 620 that is configured to selectively expose one or more subsets of functionality associated with at least one of the multiple platform configurations 604 or components (e.g., service 614, reusable definition 616, specification 618) therein. Each of the subsets of functionality can define at least one platform configuration selected from a group of alternative platform configuration possibilities. Thus, according to an aspect, various interface possibilities can include multiple hosts that can utilize one or more services, one or more reusable definitions, and/or one or more specifications. For example, the automated machine (e.g., host) implementations can include utilizing a single service (or multiple services) for two or more machines, utilizing a single reusable definition (or multiple reusable definitions) for two or more services, and/or utilizing a single specification (or multiple specifications) for two or more reusable definitions (as discussed with reference to FIG. 5).

In accordance with some aspects, visibility component 620 is configured to expose one or more subsets of functionality associated with at least one of the multiple platform configurations 604 or components (e.g., service, reusable definition, specification) therein. To expose one or more subsets of functionality, visibility component 620 can include visibility controls 622 that selectively enable and/or disable (e.g., mask and/or unmask) accessibility to various features 612.

For example, there can be three users provided with identifying credentials (e.g., user name/password combination, access to a host though biometrics, and so forth). A first user might be a supervisor that has accessibility at a high level (e.g., a highest security clearance). A second user might be a line operator that has accessibility at a medium level (e.g., security clearance that includes only those features necessary to perform work functions). A third user might be a vendor that has no clearance level, but only has accessibility to the machine for a specific function (e.g., perform testing on a certain aspect of the machinery, such as a component associated with a specification). When one of the users is signed in to a host, the identity of the user is verified and visibility controls 622 are selectively enabled and/or disabled (or masked and/or unmasked). The masking and/or unmasking by visibility component 620 allows for sealing of at least a portion of the platform configuration, which can protect various aspects of the device 602. In this example, the vendor might be able to access functionality of the service and/or reusable definition to the extent that the service and/or reusable definition needs to be accessed to provide the vendor with access to the specification (e.g., component, such as pump, valve, motor, and so on).

In the above example, the first user can have visibility to all aspects (e.g., service, reusable definition, specification) of the machinery, without limitations (e.g., all visibility controls 622 are unmasked). The second user might have visibility to a subset of the machinery aspects, such as the platform configuration that is needed to perform the tasks (e.g., a first subset of visibility controls 622 are unmasked and a second subset of visibility controls 622 are masked or sealed). The third user would have a severely restricted low-level access to a portion of a subset of the machinery aspects (e.g., the majority of visibility controls 622 are masked or sealed).

An example of a reverse accessibility to visibility controls 622 is when, for example, an engineer for a manufacturer of a specification (such as a machine component e.g., pump, motor, transducer, valve, and so forth) is making design changes and/or determining whether a certain component (e.g., specification) should be phased out. In this case, it might be beneficial for the engineer to be able to access the usages of the specification to determine the effects such changes might have on various automated host implementations. Thus, visibility component 620 can selectively access the reusable definition and/or services that point to that specification, regardless of the location and usage of the specification, reusable definition, and/or service.

For selected circumstances and/or conditions, sub-components can expose their interfaces (e.g., chiller interface). For example, during an emergency shutdown an expansion tank of a valve interface can be made external for direct access. Other compositions may include specifications that may be part of a definition for a host. This may further include input material specifications. For example, input material has to meet certain criteria for a machine (that interfaces with host) to function to output quality specifications (e.g., validation requirements).

Additionally or alternatively, device 602 comprises an identifier component 624 that can be configured to enable a subset of the platform configurations 604 exposed by the interface component 606. In accordance with some aspects, identifier component 624 enables the subset of platform configurations 604 based, in part on an application tag, a security indication, or the like.

In accordance with some aspects, the exposed portions of the platform configuration 604 can be transferred intact to another larger or aggregate (e.g., composite) platform configuration such that the portions are only exposed as being part of the aggregate (e.g., composite) platform configuration. According to some aspects, deployment component 610 transfers its interface intact to an aggregate deployment component, wherein the interface is exposed as part of the aggregate deployment component. Deployment component 610 can aggregate two or more platform configuration to create a composite platform configuration, according to an aspect.

In accordance with some aspects, identifier component 624 can tag the portions of the platform configuration that are to be exposed so that only certain portions are available for certain applications. Exposing the portions can reveal the tag information, wherein the tag information enables the user to control the accessibility and security of the portions, and so forth. In accordance with some aspects, the tag information controls whether the portions of the platform configurations are locked and protected from being manipulated or modified or whether changes can be made.

In accordance with some aspects, a user can enforce the standard assigned by a supplier of the specification, which can prevent changes from being made. The supplier of the specification can also protect the specification from being altered by defining at least a portion of the specification and assigning a predefined value that can only be altered by the supplier of the specification.

According to an aspect, HMI screens can be provided (e.g., host 608) that have multiple platform configurations that can be rerouted, which can include logic for implementing functions for different modules, different controllers, different machines. In accordance with some aspects, the logic can be utilized for testing of various platform configurations. According to some aspects, the logic can be utilized for pilot testing of different platform configurations. For example, the testing can include aggregating external references to switch a set of references.

Figure 7:
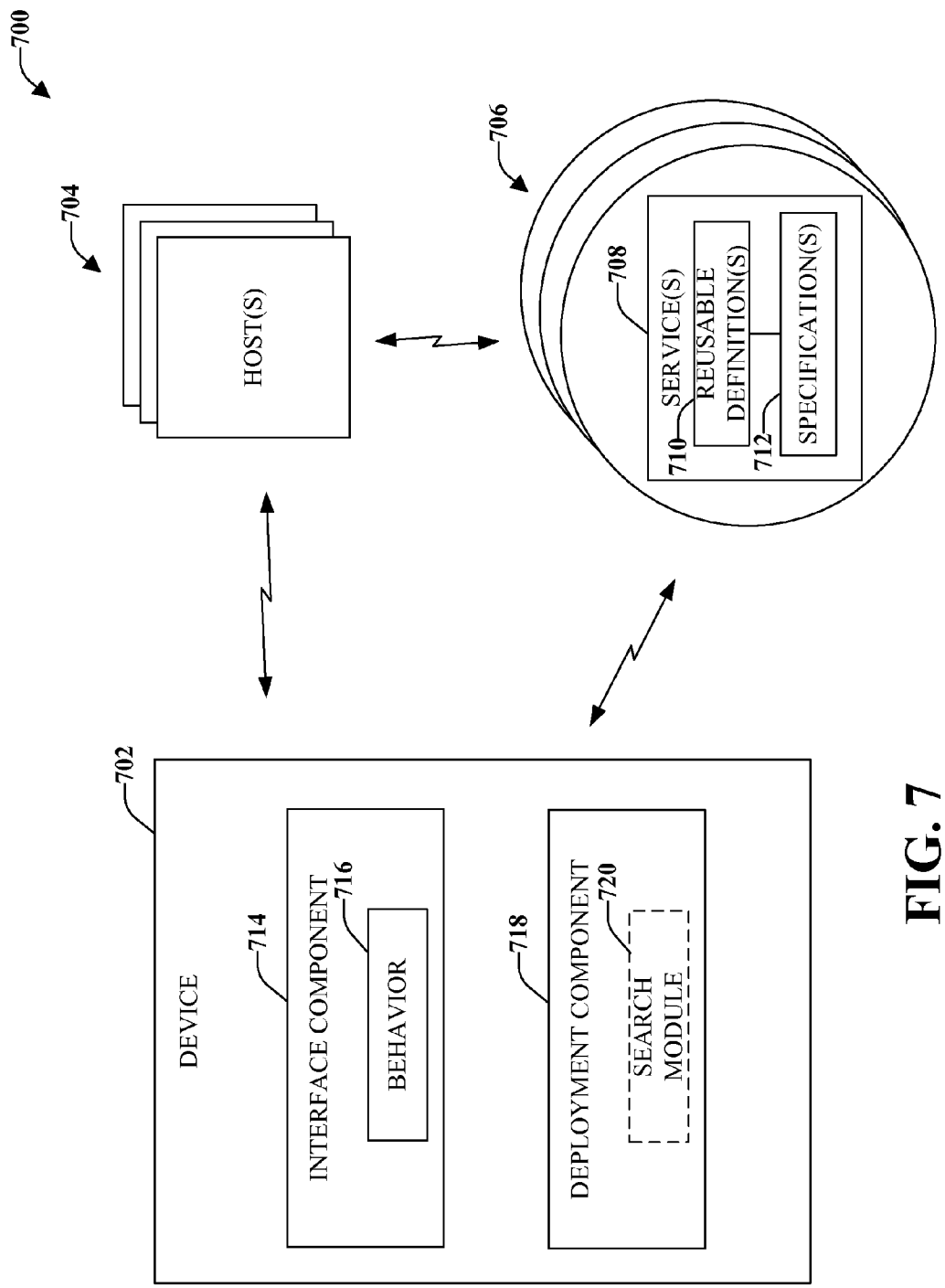
FIG. 7 illustrates a system that allows a user to define a platform configuration based on a desired behavior or result, according to an aspect.

FIG. 7 illustrates a system 700 that allows a user to define a platform configuration based on a desired behavior or result, according to an aspect. System 700 includes a device 702 that interacts with one or more hosts 704 and one or more platform configurations 706. Included in the platform configurations 706 are one or more services 708, one or more reusable definitions 710, and one or more specifications 712.

An interface component 714 is configured to allow a user (e.g., end user, a computer, and so forth) to interface with device 702. Through the interface component 714, a behavior 716 is defined. For example, the behavior 716 can be defined based on a desired end result or outcome (as defined by the user). Based on the defined behavior 716, a deployment component 718 conducts a search for the behavior, such as through a search module 720. The search module 720 conducts the search across multiple services 708, multiple reusable definitions 710, and/or multiple specifications 712, as appropriate. In accordance with some aspects, search module 720 conducts the search based on key words or phrases in the behavior 716. According to some aspects, search module 720 access a database or look-up table that comprises known behaviors that is the same as, or similar to, the defined behavior 716.

At about the same time as the defined behavior is identified by search module 720, the result is returned to the user, through the interface component 714. Thus, interface component 714 can expose one or more subsets of platform configurations associated with the desired behavior. The result can provide information related to the functionality associated with the service 708, reusable definition 710, and/or specification 712.

In a similar manner, an Original Equipment Manufacturer (OEM) or other entity can expose functionality to end users. For example, as various behaviors are defined for a service, reusable definition, and/or specification and/or new services, reusable definitions, and/or specifications are defined, the system can automatically present the information to the end user through the interface component 714. In such a manner, the user can be exposed to functionalities that might not have been previously available and/or might not have been known to the user. To expose (or push) the functionalities to the end user, the OEM or other entity can interact with interface component 714 and provide the defined behavior (new functionality). Search module 720 can ascertain whether the components (e.g., platform configuration(s)) that support the functionality can be utilized by the end user and, if appropriate, the functionality can be exposed to the end user (such as by interface component 714 presenting the information to the user on a display, for example).

In view of exemplary systems shown and described above, methods that may be implemented in accordance with the disclosed subject matter, will be better appreciated with reference to various flow charts. While, for purposes of simplicity of explanation, methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement methods described herein. It is to be appreciated that functionality associated with blocks may be implemented by software, hardware, a combination thereof or any other suitable means (e.g. device, system, process, component). Additionally, it should be further appreciated that methods disclosed throughout this specification are capable of being stored on an article of manufacture to facilitate transporting and transferring such methods to various devices. Those skilled in the art will understand and appreciate that a method could alternatively be represented as a series of interrelated states or events, such as in a state diagram.

Figure 8:
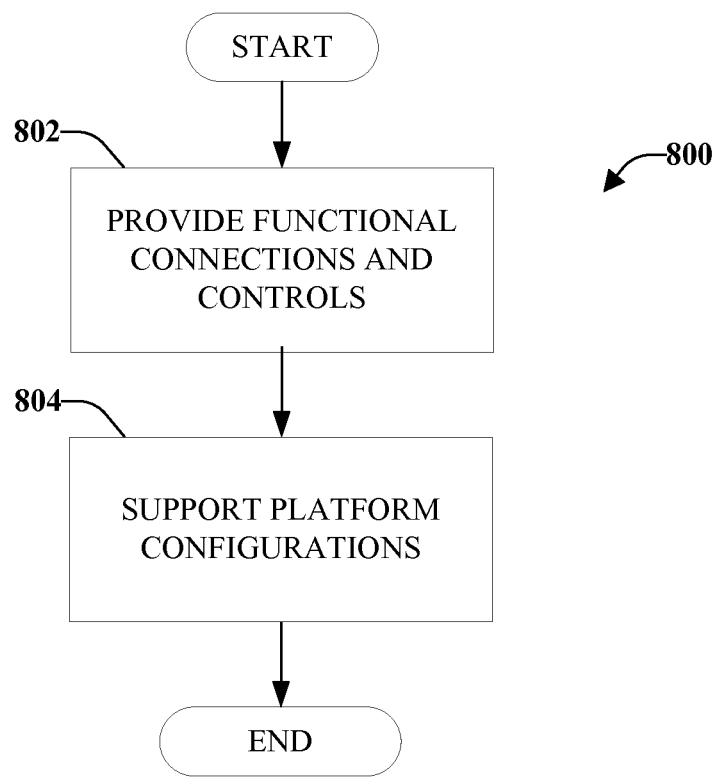
FIG. 8 illustrates a method for providing multiple machine interfaces, according to an aspect.

FIG. 8 illustrates a method 800 for providing multiple machine interfaces, according to an aspect. Method 800 can be configured to provide functional connections and controls for automated host implementations. Method 800 starts, at 802, when a set of functional connections and controls are provided for a plurality of host implementations, wherein the host implementations are configured to interact with a plurality of platform configurations. The provided set of functional connections and controls can include a mechanism for interaction between a user, one or more hosts, and multiple platform configurations. In accordance with some aspects, the one or more hosts, multiple platform configurations, and other components can be located in separate portions of an industrial control system or another environment that interacts with the industrial control system (e.g., OEM plant, satellite office, client location, and so on).

At 804, a plurality of platform configurations are supported, wherein the support is functionally independent of the platform configurations. Each platform configuration is supported individually to allow updates to one platform configuration without affecting a second platform configuration. For example, the support can be across multiple platform configurations that are functional equivalents, but that have underlying differences. For example, at least one platform configuration can have a different programming language than at least one other platform configuration. However, even though the platform configurations have different programming languages, the support can be provided for both languages and, therefore, both platform configurations can be supported.

In accordance with some aspects, method 800 comprises selectively hiding at least one reusable definition and at least one specification, wherein each platform configuration comprises at least one service, the at least one reusable definition, and the at least one specification. According to some aspects, method 800 comprises exposing at least one reusable definition and at least one specification and selectively sealing the exposed reusable definition and the exposed specification. The sealing allows the user to perceive but cannot modify the reusable definition and the specification. Thus, the reusable definition or the specification are tamper proof. Selectively hiding, exposing, and/or sealing can be a function of user credentials or other criteria.

Figure 9:
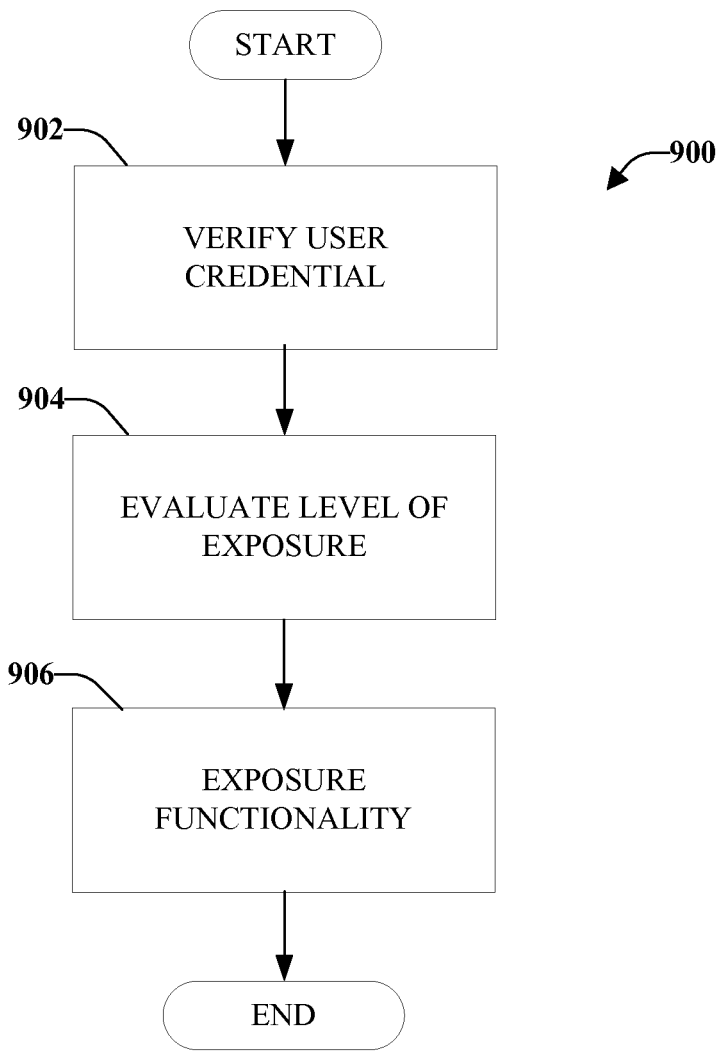
FIG. 9 illustrates a method that exposes one or more subsets of functionality of a platform configuration that can be utilized in an industrial control environment, according to an aspect.

FIG. 9 illustrates a method 900 that exposes one or more subsets of functionality of a platform configuration that can be utilized in an industrial control environment, according to an aspect. Method 900 starts, at 902, when a credential of a user is verified. The verification can comprise prompting a user for identification information (e.g., unique user name/password pair, biometric information, or other security related credentials). If the user is an entity (e.g., Internet, computer, and so forth), the identification can include information related to a relationship between the entity and the industrial control environment (e.g., OEM credentials, Internet Protocol address verification, and so forth).

Based on the verification, at 904, a level of exposure that can be supplied to the user is evaluated. The evaluation can determine whether the user is authorized to perceive data related to platform configurations or components therein (e.g., service, reusable definition, specification). In accordance with some aspects, the evaluation can determine whether the user is authorized to change data related to the platform configurations. For example, the user might be able to request that a specification and/or reusable definition be changed to a different specification and/or reusable definition. In accordance with some aspects, the user might have authorization to change a service (e.g., request a different desired result).

At 906, one or more subsets of functionality associated with the platform configuration (or components therein) is exposed. The exposure can comprise selectively enabling and/or disabling (e.g., mask and/or unmask) accessibility to various features. In an example, expose to a specification might be provided, however, exposure to a reusable definition and/or service that points to the specification might be sealed (e.g., not exposed), which can be a function of the exposure level associated with the user credential. In such a manner, various aspects of an industrial control environment can be controlled in order to protect the integrity and confidentiality of various resources with the industrial control environment.

According to some aspects, a subset of platform configurations is exposed based, in part, on an application tag, a security indication, or the like. In accordance with some aspects, the exposed portions of the platform configuration can be transferred intact to another larger platform configuration (e.g., an aggregate of two or more platform configurations).

Figure 10:
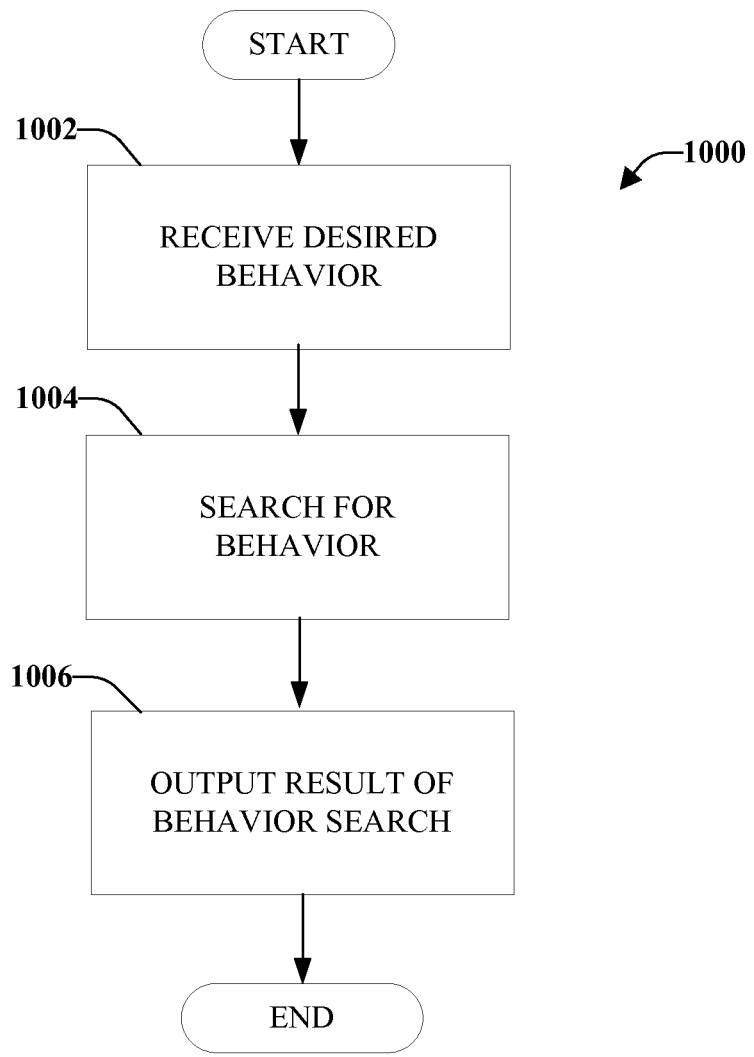
FIG. 10 illustrates a method for providing user defined platform configurations, according to an aspect.

FIG. 10 illustrates a method 1000 for providing user defined platform configurations, according to an aspect. At 1002, a defined behavior (e.g., desired result, action, and so forth) is received. The defined behavior can be received in various formats including textual and verbal and can be input by a user into a variety of different types of interfaces.

At 1004, a search for the defined behavior is performed. The search can be made across multiple services, multiple reusable definitions, and/or multiple specifications. The search can be defined based on key words or key phrases in the behavior. In accordance with some aspects, the search is defined based on a description of the outcome or result that is to be achieved. According to some aspects, a library, look-up table, database, or other computer-readable storage medium is accessed to determine if the desired behavior has been predefined. For example, the behavior can be predefined if a previous request was for a similar outcome and a platform configuration was develop for that previous request. In accordance with some aspects, the search the search is conducted to find different platform configurations that can achieve the requested behavior.

In accordance with some aspects, the various searches can result in a selection of at least one automated host implementation. Selection of the automated host implementation can comprise interfacing the at least one platform configuration with the at least one automated host implementation. According to some aspects, the selection is for a combination of service(s), reusable definition(s), and specification(s) that interface with one or more automated host implementations.

At about the same time as the defined behavior is identified a result of the search is output to the user, at 1006, in any perceivable format (e.g., visual format, textual format, audible format, an automatic host implementation, and so forth). The output can comprise providing at least one automated host implementation. In accordance with some aspects, the output can expose one or more subsets of platform configurations associated with the behavior. The output result can provide information related to the functionality associated with one or more services, reusable definitions, specifications, or combinations thereof.

In a similar manner, an Original Equipment Manufacturer (OEM) or other entity can expose functionality to end users. For example, as various behaviors are defined for a service, reusable definition, and/or specification and/or new services, reusable definitions, and/or specifications are defined, the system can automatically present the information to the end user through the interface component. In such a manner, the user can be exposed to functionalities that might not have been previously available and/or might not have been known to the user.

Figure 11:
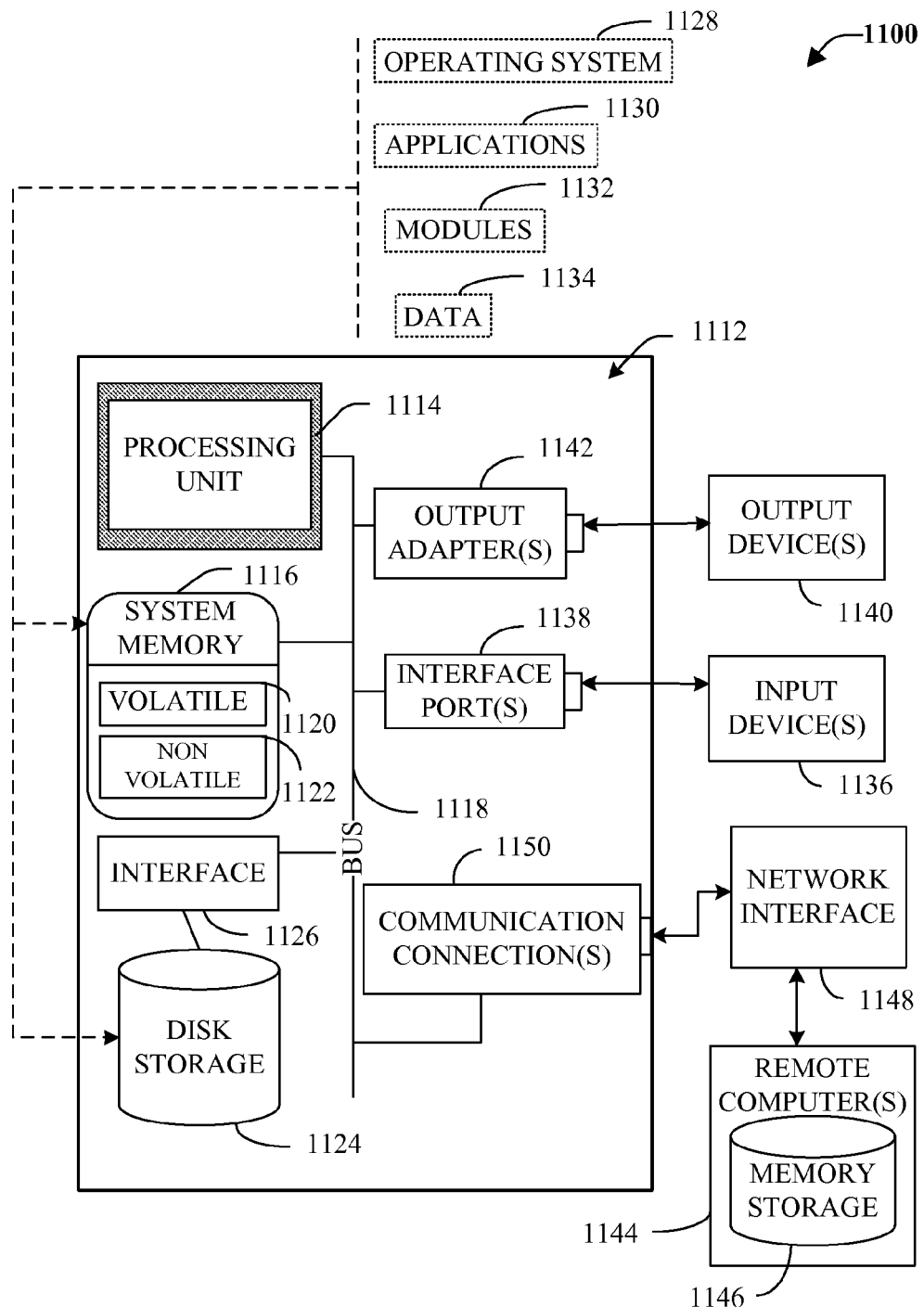
FIG. 11 illustrates a block diagram of a computer operable to execute the disclosed aspects.

Referring now to FIG. 11, illustrated is a block diagram of a computer operable to execute the disclosed system. In order to provide additional context for various aspects thereof, FIG.

11 and the following discussion are intended to provide a brief, general description of a suitable computing environment 1100 in which the various aspects of the embodiment(s) can be implemented. While the description above is in the general context of computer-executable instructions that may run on one or more computers, those skilled in the art will recognize that the various embodiments can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the illustrative environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1094 interface technologies. Other external drive connection technologies are within contemplation of the various embodiments described herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the various embodiments can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1094 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are illustrative and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 12:
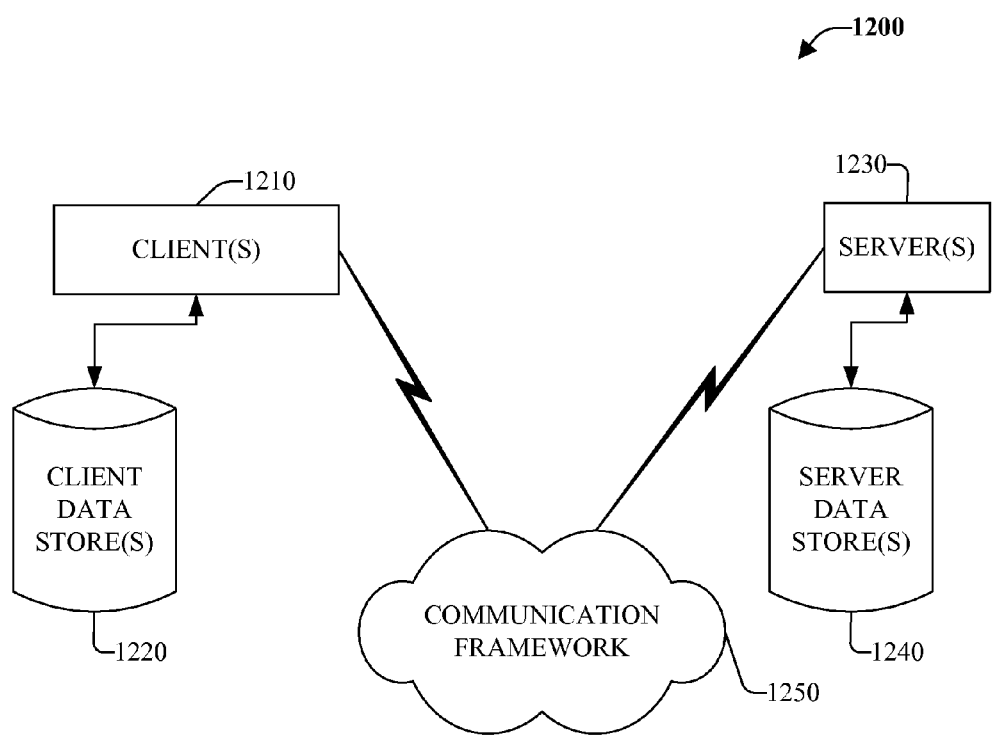
FIG. 12 illustrates a schematic block diagram of an exemplary computing environment, according to an aspect.

Referring now to FIG. 12, there is illustrated a schematic block diagram of an illustrative computing environment 1200 for processing the disclosed architecture in accordance with another aspect. The environment 1200 includes one or more client(s) 1202. The client(s) 1202 can be hardware and/or software (e.g., threads, processes, computing devices). The client(s) 1202 can house cookie(s) and/or associated contextual information in connection with the various embodiments, for example.

The environment 1200 also includes one or more server(s) 1204. The server(s) 1204 can also be hardware and/or software (e.g., threads, processes, computing devices). The servers 1204 can house threads to perform transformations in connection with the various embodiments, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

It is noted that as used in this application, terms such as "component," "module," "system," and the like are intended to refer to a computer-related, electro-mechanical entity or both, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
    a memory that stores instructions; and
    a processor that facilitates execution of the instructions to at least:
        deploy a host implementation to a plurality of platform configurations, wherein at least one of the plurality of platform configurations comprises a service, and wherein the service comprises a specification, a first reusable definition that defines a set of functional connections and controls of the service in a first language, and a second reusable definition that defines the set of one or more functional connections and controls of the service in a second language; create a plurality of interfaces between the plurality of platform configurations and the host implementation; expose the first reusable definition corresponding to the host implementation deployed to the at least one of the plurality of platform configurations comprising the service based on an application tag; and prevent exposure of the second reusable definition that does not relate to the host implementation deployed to the at least one of the plurality of platform configurations.

2. The device of claim 1, wherein the processor further facilitates the execution of the instructions to expose the reusable definition based further on a security indication.

3. The device of claim 1, wherein the service comprises a plurality of reusable definitions, including the first reusable definition and the second reusable definition, supported by at least two host implementations.

4. The device of claim 1, wherein the processor further facilitates the execution of the instructions to aggregate two or more platform configurations of the plurality of platform configurations to create a composite platform configuration.

5. The device of claim 4, wherein the processor further facilitates the execution of the instructions to aggregate the two or more platform configurations based on metadata related to the two or more platform configurations.

6. A method, comprising:
    deploying, by a system including a processor, a host implementation, comprising a service, to a plurality of platform configurations, wherein the service comprises a specification, a first reusable definition that defines one or more functional connections and controls of the service in a first language, and a second reusable definition that defines one or more functional connections and controls of the service in a second language; creating a plurality of interfaces between the plurality of platform configurations and the host implementation;
    exposing, by the system, the first reusable definition of the service of the host implementation deployed to a first platform configuration of the plurality of platform configurations based on an application tag; and
    preventing, by the system, the second reusable definition of the service that does not relate to the host implementation deployed to the first platform configuration of the plurality of platform configurations from being exposed.

7. The method of claim 6, further comprising:
    aggregating a first service associated with a first platform configuration and a second service associated with a second platform configuration to create an aggregated service.

8. The method of claim 6, wherein the exposing further comprises determining the language supported by the platform based on metadata associated with the platform.

9. The method of claim 6, further comprising:
    exposing, by the system, the second reusable definition of the service of the host implementation deployed to a second platform configuration of the plurality of platform configurations based on a language supported by the second platform configuration.

10. The method of claim 6, wherein the deploying comprises deploying the host implementation to the plurality of platform configurations comprising at least one platform configuration of a first type and at least one platform configuration of a second type.

11. The method of claim 10, wherein the deploying the host implementation comprises deploying the host implementation comprising a first layer that interfaces with the at least one platform configuration of the first type and a second layer that interfaces with the at least one platform configuration of the second type.

12. A system, comprising:
    a memory that stores instructions; and
    a processor that facilitates execution of the instructions to at least:
        provide an implementation of a host that facilitates execution of a service;
        create a plurality of interfaces between a plurality of platform configurations and the implementation of the host, wherein one of the plurality of platform configurations comprises the service, and wherein the service comprises a specification, a first reusable definition that defines one or more functional connections and controls in a first language and a second reusable definition that defines the one or more functional connections and controls in a second language;
        expose the first reusable definition of the service related to the implementation of the host corresponding to at least one of the plurality of platform configurations based on an application tag; and prevent the second reusable definition of the service that does not relate to the implementation of the host corresponding to the at least one of the plurality of platform configurations from being exposed.

13. The system of claim 12, wherein the plurality of platform configurations comprise at least one platform configuration of a first type and at least one platform configuration of a second type.

14. The system of claim 13, wherein the implementation of the host comprises a first layer that interfaces with the at least one platform configuration of the first type and a second layer that interfaces with the at least one platform configuration of the second type.

15. The system of claim 13, wherein the first type corresponds to a first programming language and the second type corresponds to a second programming language.

16. The system of claim 12, wherein the processor further facilitates the execution of the instructions to seal the implementation of the host corresponding to the at least one of the plurality of platform configurations.

17. The system of claim 12, wherein the service comprises a plurality of specifications and a plurality of reusable definitions, including the first reusable definition and the second reusable definition, including the first reusable definition and the second reusable definition, corresponding to the plurality of platforms.

18. The system of claim 12, wherein the service provides a behavior corresponding to the implementation of the host and the at least one of the plurality of platform configurations.

19. The system of claim 12, wherein the processor further facilitates execution of the instructions to at least aggregate two or more platform configurations of the plurality of platform configurations to create a composite platform configuration.

20. The system of claim 19, wherein the processor further facilitates execution of the instructions to at least aggregate the two or more platform configurations based on metadata associated with the two or more platform configurations.

\* \* \* \* \*